2,809,523
Patented Oct. 15, 1957

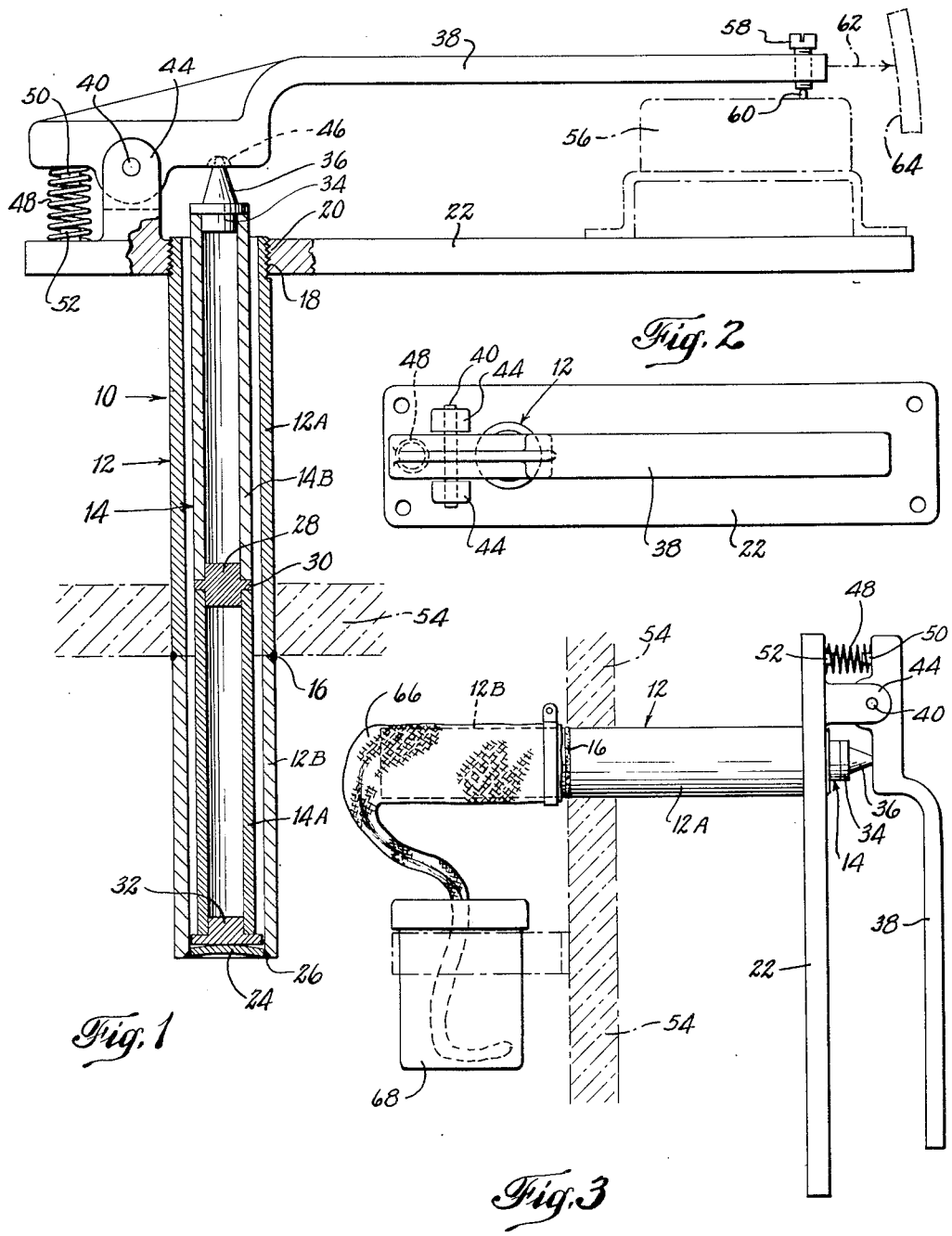

2,809,523

HUMIDITY OR TEMPERATURE DIFFERENTIAL MEASURING APPARATUS

Herbert S. Burling, South Orange, and Herbert Sherman Burling, Jr., New Providence, N. J.

Application January 19, 1953, Serial No. 331,968

3 Claims. (Cl. 73—338)

This invention relates to temperature responsive devices and more particularly to apparatus responsive to temperature differentials for indication and control of such differentials.

Prior temperature differential measuring or controlling devices known to me have generally involved somewhat complicated arrangements of elements to effect the desired result. In many instances the ends were attained through the action of independent temperature measuring means with an involved and expensive mechanical structure coupling them which required careful and accurate alignment of the elements. Devices of this nature were therefore difficult to manufacture, expensive and required the use of precision methods in the fabrication of the cooperating elements in order to produce a stable and dependable instrument.

While the apparatus in accordance with this invention overcomes the above and other disadvantages encountered in the prior art, it also provides among other things a unitary temperature responsive means that can be arranged to indicate temperature difference directly or in the alternative function to actuate a simple control mechanism without the need for complicated levers or other expensive and intricate comparing mechanisms.

Another object of the invention is a simple, inexpensive device responsive to two temperatures to produce mechanical movement proportional to the difference between those temperatures and eliminate substantially all adverse frictional effects.

Another object of the invention is a highly accurate and sensitive device responsive to temperature differentials and one that affords a high degree of stability and dependability at a relatively low cost.

Still another object of the invention is a device for measuring the temperature difference between two mediums and maintaining a fixed or variable temperature difference between them.

Still another advantage is a temperature measuring device wherein a substantially large mechanical motion is attainable per unit change in the temperature differential being measured.

The above and other objects of this invention will become more apparent in the following description and drawings forming part of this application.

In the drawings:

Fig. 1 is a front view of one form of the invention with certain elements thereof illustrated in section;

Fig. 2 is a top view of the apparatus shown in Fig. 1, drawn on a somewhat smaller scale; and Fig. 3 is a view of the invention as illustrated in Fig. 1, showing one application thereof.

The form of the invention shown in Fig. 1 is particularly useful for measuring the temperature difference between adjoining mediums such as indoor and outdoor temperatures adjoining liquid baths, etc., and may be used to control these temperatures so that one will either lead or lag changes in the other by a predetermined value. Furthermore the elements of this invention can be proportioned to maintain a substantially fixed temperature difference over the operating range or arranged to vary the differential in a predetermined manner throughout the operating range.

Referring to Fig. 1 of the drawings, 10 denotes a temperature responsive device having inner and outer concentric elements or members 14 and 12 respectively. The outer cylindrical member 12 is formed in two sections 12A and 12B brazed or otherwise joined together at 16 to form an integral unit. One end of the tubular member 12 is threaded at 18 for engagement with a threaded opening 20 in the base or support 22. The other end of tube 12 is sealed by a plug 24 preferably formed of metal of a sufficient thickness to form a firm rigid closure and secured to the member 12 by a peripheral weld 26.

The inner tubular member 14 is also formed of two separate sections 14A and 14B joined by a short cylindrical member 28 having a central peripheral flange 30 holding the two sections in spaced relationship and in accurate alignment one with the other. The lower end of member 14 is closed by a flanged plug 32 with the flanged portion thereof insuring concentric alignment of the inner and outer members 14 and 12. In the alternative, the diameter of the inner member can be made but slightly smaller than the inside diameter of the outer member so that auxiliary aligning means would not be required.

In this embodiment, the inner member 14 extends beyond the top of the outer member and is closed by a plug 34 terminating in a conical section 36 having a rounded apex.

The inner tubular member 14 is retained in position in the outer member 12 by a spring loaded lever 38 pivoted at 40 to two ears or lugs 44 attached to and extending upwardly from the base 22. The lever 38 engages the apex of cone 36 on plug 34 by means of an indent 46 on the underside thereof which may be a hardened concave plug or other suitable cooperating means. A spring 48 disposed on the opposite side of pivot 40 and held in place between the base 22 and lever 38 by bosses 50 and 52 maintains the indent 46 in constant pressure engagement with the cone 36, thus holding the several parts forming the inner element 14 in position as described. Although the sections 14A and 14B of the inner member 14 are shown as cylindrical elements, it is apparent that they may be formed of solid rods welded, brazed or otherwise joined together. In addition, the spring means 48 may be in any desirable form or position that will hold the lever 38 in constant contact with the cone 36 on the end of member 14. In certain instances it may also be desirable to form either one or both of the inner and outer members 12 and 14 with rectangular or triangular transverse sections with the inner section being either tubular or solid, as previously discussed.

The cylindrical members 12A—14A and 12B—14B are fabricated of materials having different coefficients of linear expansion so that longitudinal expansion or contraction of the inner and outer members will result in the largest physical displacement of the cone 36 and thus produce the greatest motion of the indicating or controlling lever 38.

The action of the temperature responsive member 10 can best be discussed by considering a specific case. Assuming that the apparatus of Fig. 1 is used to measure the difference between indoor and outdoor temperatures and that the member 10 is positioned relative to the wall 54 so that equal sections are exposed to each temperature. Let it also be assumed that elements 12A and 14A are formed of a material having a high temperature coefficient and the elements 12B and 14B of one having a low temperature coefficient. Now if the outside temperature as measured by the elements 12B and 14A decreases relative to the inside temperature measured by 12A and 14B then element 12B will experience rather small linear contraction while 14A will contract greatly. The difference between these two actions will result in a displacement of the cone 36 away from lever 38 and permit the right end thereof to move closer to base 22 an amount proportional to the downward shift in the outside temperature. If the inside temperature then decreases, element 12A will contract a large amount while 14B will contract very little. The difference in these two effects produces a resultant motion of the cone 36 upwardly against the lever 38 to move it away from base 22. If both temperatures decrease the same amount and at the same time, then the lever 38 would of course remain stationary. From this, it obviously follows that the resultant effects of the temperature changes on lever 38 could be reversed by making elements 12A and 14A of a low coefficient material and 12B and 14B of a high coefficient material.

In the above example, the motion imparted to lever 38 will be in direct proportion to the temperature difference measured. If on the other hand, the lengths of the responsive member 10 exposed to the different mediums are unequal, then the relation between the motion of lever 38 and the difference between the measured temperatures will not be a straight line function, but will vary in a ratio corresponding to the ratio between such unequal lengths.

One example of an important application for the device described above is in controlling the temperature inside of a building in accordance with the outside temperature to prevent condensation of moisture on expensive machinery. For this application, the temperature responsive element 10 is passed through a suitable opening in wall 54 with sections 12A and 14B on the inside, and sections 12B and 14A on the outside. By properly coordinating the action of lever 38 with a suitable switch 56 fastened to the base 22, an electric heater or other heating means can be used to maintain the indoor temperature at all times a few degrees higher than the outdoor temperature. To facilitate the adjustment of the lever 38 relative to the switch 56, a small adjusting screw 58 threadedly mounted in the end of the lever and cooperating with the switch actuating pin 60 may be employed. In any application wherein the thickness of wall 54 is appreciable, it is preferable to arrange the sections 12A and 14A in overlapping relationship with each element passing through the wall and terminating in a plane coincident with the opposite side thereof. In this way, temperature variations of the wall 54 are cancelled out with the result that the over-all accuracy of the device is substantially improved. While a single switch 56 has been shown for purposes of illustration, it is obvious that two or more such switches may be actuated by the lever 38. For instance, two switches could be arranged so that the heating apparatus is turned on at one predetermined temperature and turned off at another temperature, or one switch may be connected to an alarm or signalling device that would be operated in the event the heating device failed.

If the invention is to be used as an indicator of temperature difference, a pointer 62 may be coupled in any suitable manner to the lever 38 to indicate the measured temperature difference on a calibrated scale 64.

It is apparent from the above description that the temperature responsive element for measuring temperature difference is a compact, simple and effective device that can be readily arranged to actuate any suitable indicator or controlling means directly and without the need for complicated mechanical couplings. Moreover, the measuring element is completely frictionless and may serve a wide variety of purposes by properly choosing the materials of which the members 12A and 12B, and 14A and 14B are fabricated. In applications where it is desired for instance, to vary the temperature difference in a predetermined pattern relative to the actual temperatures being measured, either the lengths of the member 10 exposed to each temperature may be varied or the materials in each of the sections 12A and 14B and 12B and 14A may be chosen to effect the desired result.

By reason of the particular construction and the arrangment of elements of this temperature sensitive device, each element of this device is subjected only to tensile and compressional stresses and in actual applications these stresses are of small magnitude. The avoidance of any requirement of the elements to withstand bending of torsional stresses greatly increases the range of materials that may be used with the result that much greater sensitivities can be attained. For instance ceramic compositions having zero and even negative temperature coefficients can be used to considerable advantage. When a ceramic is used as part of the outer element 12 however, the sections 12A and 12B may be joined by a threaded connection at 16 or by any other suitable mechanical fastening means that will firmly join the two sections.

Fig. 3 illustrates a specific application of the invention that may be used for maintaining a fixed relative humidity in a room. In this figure, the structural details of the apparatus are identical to those shown and described in Fig. 1, and like numerals have been used to denote like parts in each figure. As humidity is a function of the amount of moisture in the air at a given temperature, it can be measured by determining the air temperature on one instrument and a second temperature on an instrument influenced by the rate of evaporation of moisture from its temperature sensitive element. This latter measurement is normally referred to as the wet bulb temperature. From the difference in these temperatures the relative humidity can be determined.

For this purpose a cloth sock 66 is placed over section 12B of the element 12 with the free end of the sock being immersed in a cup of water 68 supported by the baffle 54. If desired, any means well known in the art, such as a fan or the like, may be used to circulate air in and about that part of the moistened sock surrounding the element or section 12B.

In the case where the room temperature is permitted to fluctuate, the difference between the wet and the dry bulb temperatures will increase as the dry bulb temperature (element 12A) increases for any given relative humidity. This is substantially a straight line relationship, although the slope changes as the relative humidity changes. Therefore, for any fixed relative humidity, this embodiment would be constructed with sections 12A and 12B, and 14A and 14B of unequal length or in the alternative of different materials to attain the same effect as previously described. More specifically, to maintain a fixed relative humidity, provision must be made so that lever 38 will vary with changes in the dry bulb temperature in the same ratio as the wet and dry bulb temperature difference varies with the dry bulb temperature for a given relative humidity. With this ratio known, the coefficients of the materials for element sections 12A and 12B, and 14A and 14B and the relative lengths of sections 12A and 12B can be determined for any relative humidity. Although not illustrated in Fig. 3, the lever 38 in this application is arranged to actuate a control switch such as switch 56 of Fig. 1, and in turn control a conventional humidifier and drying apparatus for maintaining the desired fixed relative humidity.

From the foregoing example it is apparent that this invention may also be used to control humidity in a room when the temperature is controlled by separate well known devices. In this case, the humidity varies substantially linearly with the difference between the wet and dry bulb readings, and the movement of lever 38 for a given change in humidity will be directly proportional to the length of section 12B which measures the wet bulb temperature.

The invention in its broader aspects is not limited to the specific mechanisms shown and described but departures may be made therefrom within the scope of the accompanying claims without departing from the principles of the invention and without sacrificing its chief advantages.

What is claimed is:

1. Apparatus for indicating relative humidity comprising a thermal element formed in two sections whereby two outer tubular members joined end to end have different thermal expansion characteristics and each section has an inner tubular member having the same thermal expansion as the outer tubular member of the other section, the high expansion member in one section having the same length as the high expansion member in the other section, and the low expansion elements likewise being equal in length, the lengths of the high expansible member being substantially different from the lengths of the low expansible members whereby a central zone of substantial length is formed where both the inner and outer tubular members have the same expansion characteristics, means connecting the end of the outer tubular member with the corresponding end of the inner tubular member at one end of the element, indicating means coupled to the ends of said tubular members at the other end of the element and moisture absorbent means surrounding one of said outer tubular sections.

2. Temperature responsive apparatus for measuring the temperature differential between adjoining zones comprising a barrier between said zones, a thermal element extending through said barrier, said thermal element being formed in two sections whereby two outer tubular members joined end to end have different thermal expansion characteristics and each section has an inner tubular member having the same thermal expansion as the outer tubular member of the other section, the high expansion member in one section having the same length as the high expansion member in the other section, and the low expansion elements likewise being equal in length, the lengths of the high expansible member being substantially different from the lengths of the low expansible members whereby a central zone of substantial length is formed where both the inner and outer tubular members have the same expansion characteristics, said central zone being at least partially surrounded by said barrier, means coupling the outer tubular member with the corresponding end of the inner tubular member at one end of the element, and means connected between the ends of said inner and outer tubular members at the other end of the element.

3. Temperature responsive apparatus for measuring the temperature differential between adjoining zones comprising a thermal element having part exposed to one zone and part to the other zone, said element being formed in two sections whereby the two outer tubular members joined end to end have different thermal expansion characteristics and each section has an inner member having substantially the same thermal expansion as the outer tubular member of the other section, the lengths of one pair of members having substantially the same expansion characteristics being substantially different than the lengths of the other pair of members to form a central zone of substantial length is formed where both the inner and outer members have the same expansion characteristics, means joining the inner and outer members at one end of the element and indicating means connected to the inner and outer members at the other end of the element.

References Cited in the file of this patent

UNITED STATES PATENTS

| | | |
|---|---|---|
| 896,690 | Carrier | Aug. 18, 1908 |
| 1,122,077 | Comfort | Dec. 22, 1914 |
| 2,055,922 | Brennen | Sept. 29, 1936 |
| 2,210,526 | Burling | Aug. 6, 1940 |

FOREIGN PATENTS

| | | |
|---|---|---|
| 893,844 | France | Feb. 28, 1944 |
| 663,355 | Germany | Aug. 26, 1938 |